(12) United States Patent
Rider et al.

(10) Patent No.: US 9,659,494 B2
(45) Date of Patent: May 23, 2017

(54) TECHNOLOGIES FOR REPORTING AND PREDICTING EMERGENCY VEHICLE ROUTES

(71) Applicant: Intel Corporation, Santa Clara, CA (US)

(72) Inventors: Tomer Rider, Naahryia (IL); Shahar Taite, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,274

(22) Filed: Sep. 26, 2014

(65) Prior Publication Data

US 2016/0093213 A1 Mar. 31, 2016

(51) Int. Cl.
| | |
|---|---|
| *H04W 4/04* | (2009.01) |
| *G08G 1/0965* | (2006.01) |
| *G08G 1/0967* | (2006.01) |
| *G01C 21/36* | (2006.01) |
| *G08G 1/0968* | (2006.01) |
| *H04W 4/02* | (2009.01) |
| *H04W 4/22* | (2009.01) |

(52) U.S. Cl.
CPC ... *G08G 1/096775* (2013.01); *G01C 21/3697* (2013.01); *G08G 1/0965* (2013.01); *G08G 1/096716* (2013.01); *G08G 1/096741* (2013.01); *G08G 1/096816* (2013.01); *G08G 1/096827* (2013.01); *G08G 1/096844* (2013.01); *H04W 4/025* (2013.01); *H04W 4/046* (2013.01); *H04W 4/22* (2013.01)

(58) Field of Classification Search
CPC .... G01C 21/00; G01C 21/34; G06Q 30/0266; H04L 67/104; G08G 1/096741; G08G 1/096775; G08G 1/202; B60W 20/12; B60W 50/14
See application file for complete search history.

(56) References Cited

U.S. PATENT DOCUMENTS

| | | | |
|---|---|---|---|
| 7,515,065 B1* | 4/2009 | Bygrave | G08G 1/0965 340/901 |
| 8,931,076 B2* | 1/2015 | Bello | H04L 45/42 726/13 |
| 2005/0093717 A1* | 5/2005 | Lilja | G08G 1/0965 340/902 |
| 2008/0101367 A1* | 5/2008 | Weinman | H04L 45/00 370/392 |
| 2011/0001638 A1* | 1/2011 | Pudar | G08G 1/20 340/988 |

(Continued)

*Primary Examiner* — Thomas G Black
*Assistant Examiner* — Demetra Smith-Stewart
(74) *Attorney, Agent, or Firm* — Barnes & Thornburg LLP

(57) ABSTRACT

Technologies for reporting and predicting emergency vehicle routes include a cloud server to receive emergency vehicle route data from an emergency vehicle, the emergency vehicle route data indicating a travel route of the emergency vehicle. The cloud server determines a scope of disclosure of the travel route to other vehicles based on the emergency vehicle route data and which other vehicles different from the emergency vehicle to which to convey the travel route of the emergency vehicle. The cloud server transmits a portion of the travel route of the emergency vehicle to the other vehicles based on the scope of disclosure.

23 Claims, 6 Drawing Sheets

(56) References Cited

U.S. PATENT DOCUMENTS

| | | | |
|---|---|---|---|
| 2012/0078506 A1* | 3/2012 | Husain | G01C 21/3492 |
| | | | 701/414 |
| 2012/0136559 A1* | 5/2012 | Rothschild | G08G 1/0965 |
| | | | 701/117 |
| 2012/0330543 A1* | 12/2012 | Dingler | H04W 4/02 |
| | | | 701/400 |
| 2013/0131921 A1 | 5/2013 | Uhlmann et al. | |
| 2014/0227991 A1* | 8/2014 | Breton | H04W 4/22 |
| | | | 455/404.2 |

* cited by examiner

TECHNOLOGIES FOR REPORTING AND PREDICTING EMERGENCY VEHICLE ROUTES

BACKGROUND

It is critical that ambulances, fire trucks, police cars, and other emergency vehicles be able to navigate quickly and safely to emergency locations in order to provide life-saving services. Such emergency vehicles oftentimes encounter heavy traffic areas and challenging road conditions, particularly in metropolitan areas. For example, ambulances must often weave between cars to get to a particular location.

Drivers of non-emergency vehicles currently move to the side of the road only after seeing emergency vehicle lights or hearing emergency vehicle sirens. In other words, drivers respond to emergency vehicles in a very reactionary way and not in a coordinated or premeditated manner. However, lights and sirens are rarely noticed when an emergency vehicle is a significant enough distance away from the vehicles to provide the vehicles sufficient time to efficiently pave a lane for the emergency vehicle. Instead, the lights and sirens are typically noticed only a few hundred feet away from the vehicles and, if the emergency vehicle is approaching an intersection from a crossroad, a much shorter distance or not at all. As such, emergency vehicles may spend a significant amount of time simply waiting for non-emergency vehicles to move before proceeding to the emergency location.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
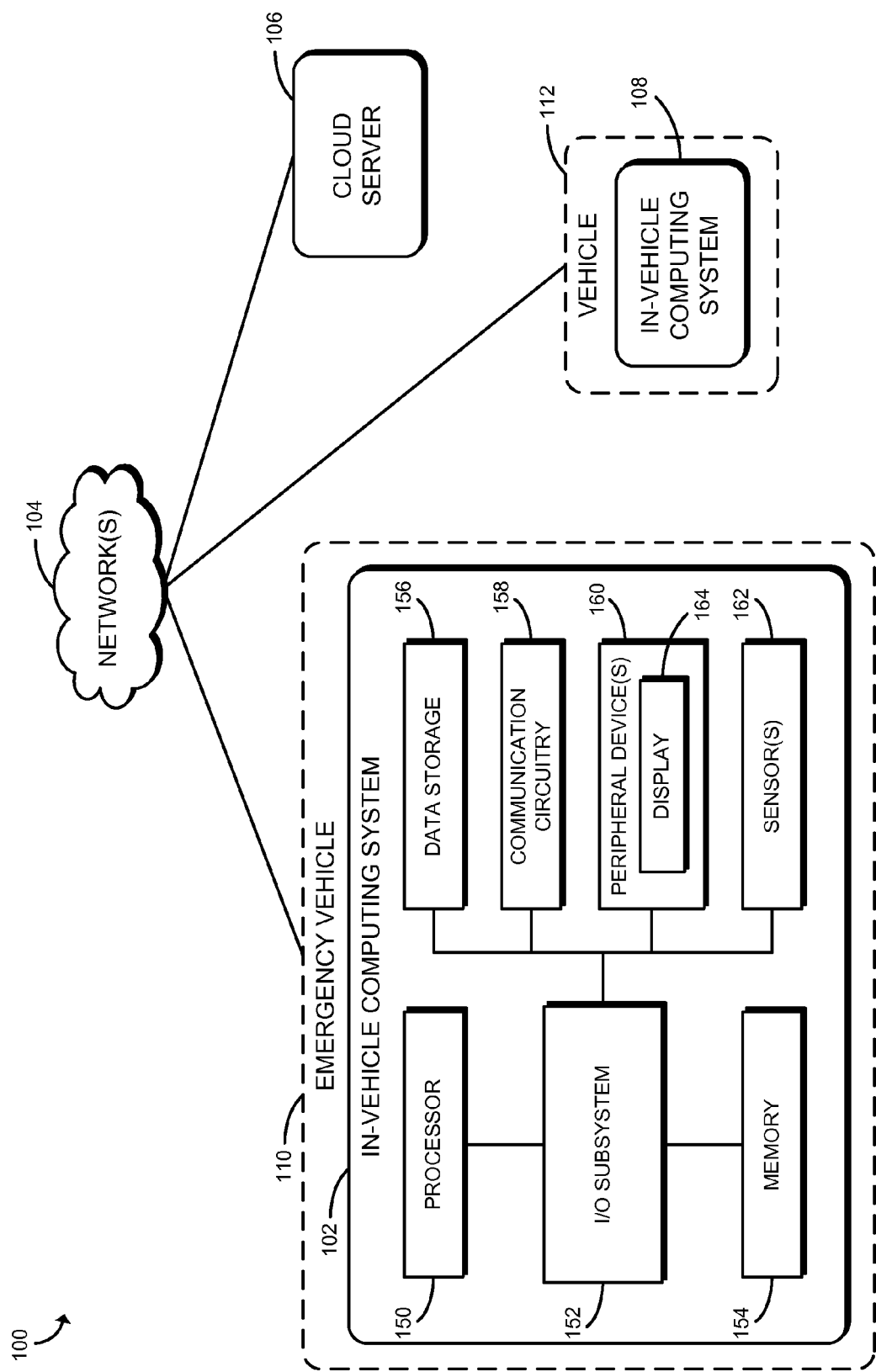
FIG. 1 is a simplified block diagram of at least one embodiment of a system for reporting and predicting emergency vehicle routes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system for reporting and predicting emergency vehicle routes includes an in-vehicle computing system 102, a network 104, a cloud server 106, and an in-vehicle computing system 108. As shown in FIG. 1, the in-vehicle computing system 102 is included in an emergency vehicle 110 and the in-vehicle computing system 108 is included in a vehicle 112. In the illustrative embodiment, the emergency vehicle 110 is embodied as a wheeled emergency vehicle such as an ambulance, fire truck, police car, or another emergency vehicle, and the vehicle 112 may be embodied as a wheeled passenger vehicle (e.g., a car, truck, truck-tractor, bus, etc.). In other embodiments, the emergency vehicle 110 may be embodied as a non-emergency vehicle. It should be appreciated that, in other embodiments, the emergency vehicle 110 and/or the vehicle 112 may be embodied as another type of vehicle (e.g., as a rail-driven vehicle, aircraft, maritime vessel, unmanned vehicle, drone, or another vehicle suited for application of the described techniques and mechanisms) or other moveable apparatus.

Each of the in-vehicle computing systems 102, 108 may be embodied as any type of computing system capable of performing the functions described herein. Although only one in-vehicle computing system 102, one network 104, one cloud server 106, and one in-vehicle computing system 108 are illustratively shown in FIG. 1, the system 100 may include any number of in-vehicle computing systems 102, network 104, cloud servers 106, and/or in-vehicle computing systems 108 in other embodiments. For example, the in-vehicle computing system 102 of the emergency vehicle 110 may report its travel route to several different vehicles 112 by virtue of the cloud server 106 as described below.

As described in detail below, the emergency vehicle 110 may report its travel route to the cloud server 106 and indicate the scope or extent by which the cloud server 106 should report the travel route of the emergency vehicle 110 to other vehicles 112. Depending on the particular embodiment, the cloud server 106 may transmit an entire or partial travel route of the emergency vehicle 110 to the vehicles 112 as described below. The vehicle 112 determines its travel route (e.g., from a satellite navigation system, context, and/or historical route data) and determines possible intersection points of the travel route of the vehicle 112 and the travel route of the emergency vehicle 110 (i.e., points in which the vehicle 112 and the emergency vehicle 110 are likely to encounter one another). The vehicle 112 may alert the driver of possible encounters with the emergency vehicle 110 (e.g., on a navigation system) and/or provide the drive with alternative routes to avoid the emergency vehicle 110. It should be appreciated that the techniques described herein may also be employed by autonomous vehicle grids to enable premeditated reactions to probably emergency vehicle encounters.

As shown in FIG. 1, the illustrative in-vehicle computing system 102 includes a processor 150, an input/output ("I/O") subsystem 152, a memory 154, a data storage 156, a communication circuitry 158, one or more peripheral devices 160, and one or more sensors 162. Additionally, the peripheral devices 160 may include a display 164. Of course, the in-vehicle computing system 102 may include other or additional components, such as those commonly found in a typical computing device (e.g., various input/output devices and/or other components), in other embodiments. Additionally, in some embodiments, one or more of the illustrative components may be incorporated in, or otherwise from a portion of, another component. For example, the memory 154, or portions thereof, may be incorporated in the processor 150 in some embodiments.

The processor 150 may be embodied as any type of processor capable of performing the functions described herein. For example, the processor 150 may be embodied as a single or multi-core processor(s), digital signal processor, microcontroller, or other processor or processing/controlling circuit. Similarly, the memory 154 may be embodied as any type of volatile or non-volatile memory or data storage capable of performing the functions described herein. In operation, the memory 154 may store various data and software used during operation of the in-vehicle computing system 102 such as operating systems, applications, programs, libraries, and drivers. The memory 154 is communicatively coupled to the processor 150 via the I/O subsystem 152, which may be embodied as circuitry and/or components to facilitate input/output operations with the processor 150, the memory 154, and other components of the in-vehicle computing system 102. For example, the I/O subsystem 152 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 152 may form a portion of a system-on-a-chip (SoC) and be incorporated, along with the processor 150, the memory 154, and other components of the in-vehicle computing system 102, on a single integrated circuit chip.

The data storage 156 may be embodied as any type of device or devices configured for short-term or long-term storage of data such as, for example, memory devices and circuits, memory cards, hard disk drives, solid-state drives, or other data storage devices. The data storage 156 and/or the memory 154 may store various data useful in the operation of the in-vehicle computing system 102 as discussed below.

The communication circuitry 158 of the in-vehicle computing system 102 may be embodied as any communication circuitry, device, or collection thereof, capable of enabling communications between the in-vehicle computing system 102 and other remote devices (e.g., the cloud server 106). The communication circuitry 158 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 160 may include any number of additional peripheral or interface devices, such as speakers, microphones, additional storage devices, and so forth. The particular devices included in the peripheral devices 160 may depend on, for example, the type and/or intended use of the in-vehicle computing system 102. In the illustrative embodiment, the peripheral devices 160 include a display 164. The display 164 may be embodied as any one or more display screens on which information may be displayed to a user of the in-vehicle computing system 102 (e.g., a driver or passenger of the vehicle). The display 164 may be embodied as, or otherwise use, any suitable display technology including, for example, a liquid crystal display (LCD), a light emitting diode (LED) display, a cathode ray tube (CRT) display, a plasma display, and/or other display technology. Although only a single display 164 is illustrated in FIG. 1, it should be appreciated that the in-vehicle computing system 102 may include multiple displays or display screens on which the same or different content may be displayed contemporaneously or sequentially with each other.

The sensors 162 collect sensor data associated with the in-vehicle computing system 102 (e.g., its context, environment, and/or other characteristics). Each of the sensors 162 may be embodied as any type of sensor or sensor circuitry to detect, capture, measure, or sense any suitable aspect of the local environment of the in-vehicle computing system 102. In various embodiments, the sensors 162 may be embodied as, or otherwise include, for example, inertial sensors, proximity sensors, optical sensors, light sensors, audio sensors, temperature sensors, motion sensors, piezoelectric sensors, pressure sensors, and/or other types of sensors that generate data useful to the in-vehicle computing system 102 and/or other computing devices (e.g., the cloud server 106). For example, in some embodiments, the sensors 162 may include a location sensor (e.g., a global positioning system (GPS) sensor), a temporal sensor (e.g., a clock), an inertial measurement unit (IMU), and/or other sensors. Of course, the in-vehicle computing system 102 may also include components and/or devices configured to facilitate the use of the sensors 162.

The network 104 may be embodied as any type of communication network capable of facilitating communication between the in-vehicle computing system 102 and remote devices (e.g., the cloud server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The cloud server 106 may be embodied as any server or computing device capable of performing the functions described herein. For example, the cloud server 106 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. Further, the cloud server 106 and the in-vehicle computing system 108 may be similar to the in-vehicle computing system 102. In particular, the cloud server 106 and/or the in-vehicle computing system 108 may include components similar to the components of the in-vehicle computing system 102 described above and/or components commonly found in a server such as a processor, memory, I/O subsystem, data storage, peripheral devices, and so forth, which are not illustrated in FIG. 1 for clarity of the description. In some embodiments, one or more of the in-vehicle computing systems 102, 108 may be alternatively embodied as a mobile computing device (e.g., a smartphone or wearable computing device of the vehicle driver or passenger).

Figure 2:
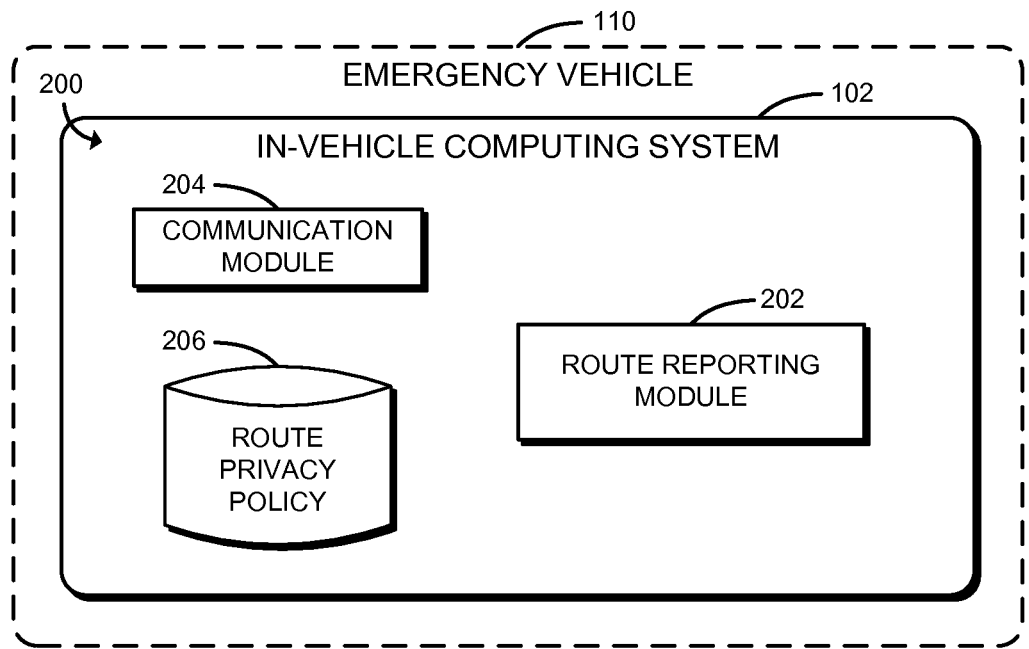
FIG. 2 is a simplified block diagram of at least one embodiment of an environment of an in-vehicle computing system of an emergency vehicle of the system of FIG. 1.

Referring now to FIG. 2, in use, the in-vehicle computing system 102 of the emergency vehicle 110 establishes an environment 200 for reporting travel routes of the emergency vehicle 110 to the cloud server 106. The illustrative environment 200 of the in-vehicle computing system 102 includes a route reporting module 202 and a communication module 204. Each of the modules of the environment 200 may be embodied as hardware, firmware, software, or a combination thereof. Additionally, in some embodiments, one or more of the illustrative modules may form a portion of another module and/or one or more of the illustrative modules may be embodied as a standalone or independent module. For example, each of the modules, logic, and other components of the environment 200 may form a portion of, or otherwise be established by, the processor 150 of the in-vehicle computing system 102.

The route reporting module 202 determines the travel route of the emergency vehicle 110 and a route privacy policy 206 associated with the travel route. It should be appreciated that the travel route of the emergency vehicle 110 may be predetermined based on the current location of the emergency vehicle 110, the emergency destination, contextual information (e.g., time of day, traffic patterns, season, weather, etc.), and/or other suitable information. Further, the travel route may be calculated in real time and/or periodically updated (e.g., based on changes in location, direction, overall route, and/or other travel characteristics). In some embodiments, the travel route of the emergency vehicle 110 may be extracted from navigation system of the in-vehicle computing system 102. As described below, the route privacy policy 206 indicates the authorized scope of disclosure of the travel route of the emergency vehicle 110 to other vehicles 112 (e.g., non-emergency vehicles). In the illustrative embodiment, the route reporting module 202 determines whether to authorize the cloud server 106 to transmit the entire travel route of the emergency vehicle 110 or only a portion of the travel route. In particular, the route privacy policy 206 may establish various conditions or criteria associated with the disclosure of the travel route. For example, the route privacy policy 206 may indicate that the cloud server 106 is authorized to transmit to a particular vehicle 112 only the portion of the travel route of the emergency vehicle 110 that is between the emergency vehicle 110 and the vehicle 112.

The communication module 204 handles the communication between the in-vehicle computing system 102 of the emergency vehicle 110 and remote computing devices (e.g., the cloud server 106) through the network 104. For example, as described herein, the communication module 204 may report the travel route of the emergency vehicle 110 to the cloud server 106 for subsequent transmission (or partial transmission) to other vehicles 112. In doing so, the communication module 204 may also transmit the route privacy policy 206 of the emergency vehicle 110 associated with the current travel route of the emergency vehicle 110.

Figure 3:
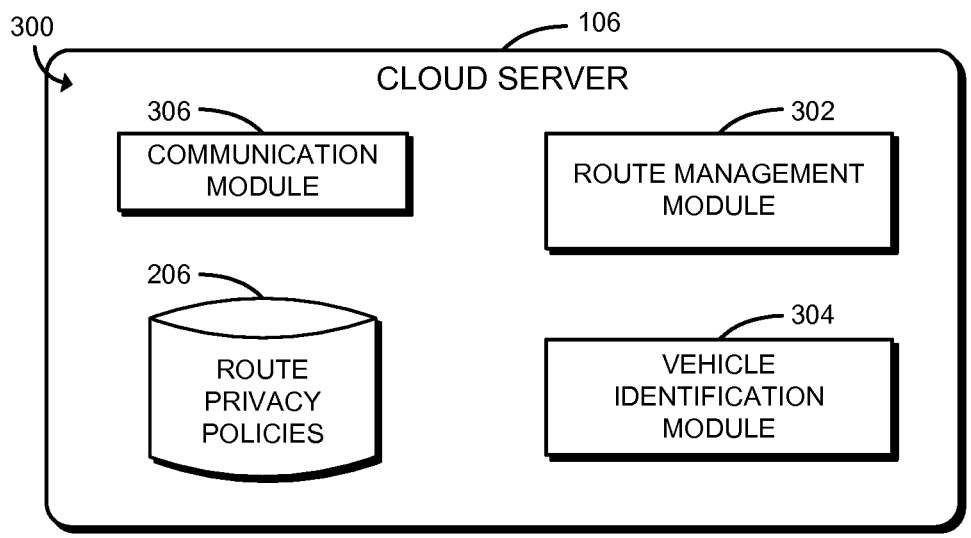
FIG. 3 is a simplified block diagram of at least one embodiment of an environment of a cloud server of the system of FIG. 1.

Referring now to FIG. 3, in use, the cloud server 106 establishes an environment 300 for reporting travel routes of emergency vehicles 110 to other vehicles 112. The illustrative environment 300 of the cloud server 106 includes a route management module 302, a vehicle identification module 304, and a communication module 306. Each of the modules of the environment 300 may be embodied as hardware, firmware, software, or a combination thereof. Additionally, in some embodiments, one or more of the illustrative modules may form a portion of another module and/or one or more of the illustrative modules may be embodied as a standalone or independent module. For example, each of the modules, logic, and other components of the environment 300 may form a portion of, or otherwise be established by, a processor of the cloud server 106.

The route management module 302 determines the travel routes of emergency vehicles 110 and the scope of disclosure of those travel routes (i.e., how much travel route information to disclose) based on emergency vehicle route data received from those emergency vehicles 110 (e.g., via the communication module 306). In some embodiments, the route management module 302 may receive, store, update, and/or otherwise utilize the route privacy policies 206 of the emergency vehicles 110 in determining the extent of disclosure (e.g., full vs. partial) of the travel routes of the emergency vehicles 110 to other vehicles 112. Depending on the particular embodiment, the route management module 302 may utilize, for example, a different route privacy policy 206 for each emergency vehicle 110, a different route privacy policy 206 for each particular route of an emergency vehicle 110, the same route privacy policy 206 for each emergency vehicle 110 or type of emergency vehicle 110 (e.g., police car, fire truck, ambulance, etc.).

The vehicle identification module 304 determines which vehicles 112 to which to convey the travel route of the emergency vehicles 110. In some embodiments, the vehicle identification module 304 determines which vehicles 112 are likely to encounter a particular emergency vehicle 110 based on the travel route of that emergency vehicle 110. For example, the vehicle identification module 304 may identify vehicles 112 nearby or within a threshold distance/region of the emergency vehicle 110 (e.g., within a few hundred feet, within a mile, within several miles, within a defined geographical region, etc.). Further, in some embodiments, the vehicle identification module 304 may determine inertial characteristics of vehicles 112 to determine whether the emergency vehicle 110 is likely to cross paths with particular vehicles 112. For example, if the emergency vehicle 110 and vehicle 112 are moving toward one another or toward some cross section or other intersection point, the vehicles 110, 112 may be more likely to encounter one another than if the vehicles 110, 112 are moving in opposite directions. It should be appreciated that a possible intersection point of the emergency vehicle 110 and the vehicle 112 may be an intersection of two cross streets, a point on a single one-way or two-way street, or another suitable intersection point.

The communication module 306 handles the communication between the cloud server 106 and remote computing devices (e.g., the in-vehicle computing systems 102, 108) through the network 104. For example, as described herein, the communication module 306 may receive the emergency vehicle route data from the emergency vehicle 110 or, more particularly, the in-vehicle computing system 102 and transmit the relevant travel route data (e.g., full or partial route information) of the emergency vehicle 110 to one or more in-vehicle computing systems 108 of vehicles 112 identified/selected by the cloud server 106.

Figure 4:
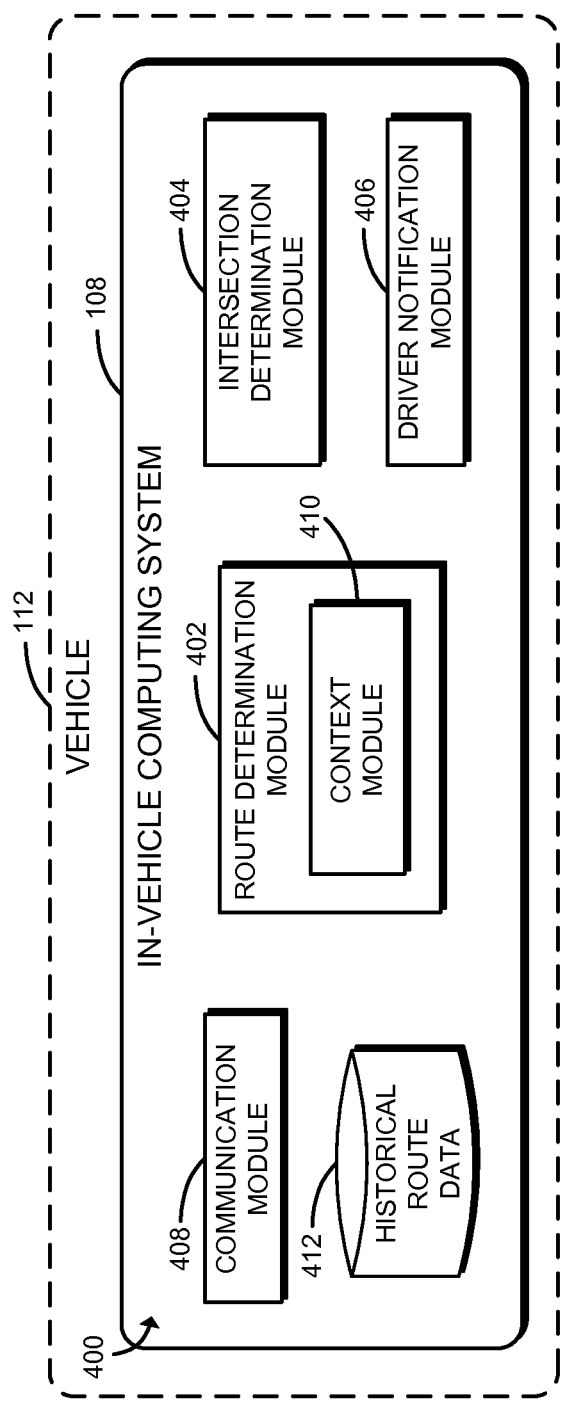
FIG. 4 is a simplified block diagram of at least one embodiment of an environment of an in-vehicle computing system of a vehicle of the system of FIG. 1.

Referring now to FIG. 4, in use, the in-vehicle computing system 108 of the vehicle 112 establishes an environment 400 for predicting travel routes of emergency vehicles 110. The illustrative environment 400 of the in-vehicle computing system 108 includes a route determination module 402, an intersection determination module 404, a driver notification module 406, and a communication module 408. Additionally, the route determination module 402 includes a context module 410. Each of the modules of the environment 400 may be embodied as hardware, firmware, software, or a combination thereof. Additionally, in some embodiments, one or more of the illustrative modules may form a portion of another module and/or one or more of the illustrative modules may be embodied as a standalone or independent module. For example, each of the modules, logic, and other components of the environment 400 may form a portion of, or otherwise be established by, the processor of the in-vehicle computing system 108.

The route determination module 402 determines the anticipated travel route of the vehicle 112. In some embodiments, the route determination module 402 retrieves the travel route of the vehicle 112 from a navigation system of the in-vehicle computing system 108 or otherwise determines a predefined travel route of the vehicle 112. However, in other embodiments, there may not be a predefined travel route stored on the memory of the in-vehicle computing system 108. For example, the driver may be operating the vehicle 112 to travel to a known location having a route committed to memory. As such, in some embodiments, the route determination module 402 may otherwise determine the travel route of the vehicle 112. For example, the route determination module 402 may determine the travel route of the vehicle 112 based on a context of the vehicle 112, historical route data 412, and/or other suitable information. The historical route data 412 may be embodied as any data associated with a past travel route of the vehicle 112 and/or a particular driver of the vehicle 112. The context module 410 determines the context of the vehicle 112 at a particular point in time. For example, the context module 410 may analyze data collected by sensors 162 of the in-vehicle computing system 108 and/or other information useful in determining the travel route of the vehicle 112.

The intersection determination module 404 determines an intersection point of the travel route of a particular emergency vehicle 110 and the travel route of the vehicle 112. For example, in some embodiments, the intersection determination module 404 determines a time and location at which the vehicle 112 is expected to encounter the emergency vehicle 110. In some embodiments, the intersection determination module 404 compares the travel routes of the vehicles 110, 112 to make such a determination. Further, the intersection determination module 404 may also consider the real-time location and/or inertial characteristics (e.g., speed) of the vehicles 110, 112 in some embodiments.

The driver notification module 406 alerts the driver of the vehicle 112 of possible encounters with emergency vehicles 110. To do so, the driver notification module 406 may, for example, display the travel route of one or more emergency vehicles 110 and/or determined intersection points of the vehicle 112 with emergency vehicles 110 on a display 164 of the in-vehicle computing system 108 (e.g., on a navigation system). Further, in some embodiments, the driver notification module 406 may provide one or more alternative routes for the vehicle 112 in order to avoid an encounter with the emergency vehicle 110. It should be appreciated that the driver notification module 406 may be integrated with a mapping service or provide an application programming interface (API) to a mapping service of the vehicle 112 in order to provide such alerts and/or reporting of the travel routes of emergency vehicles 110. In some embodiments, the driver notification module 406 notifies the driver of possible encounters (e.g., intersection points or travel routes) of multiple emergency vehicles 110 near the vehicle 112 or otherwise within some threshold distance/region of the vehicle 112.

The communication module 408 handles the communication between the in-vehicle computing system 108 and remote computing devices (e.g., the cloud server 106) through the network 104. For example, as described herein, the communication module 408 may receive information associated with the travel route of one or more emergency vehicles 110 (e.g., full or partial route data), which is used to predict/determine possible encounters with emergency vehicles 110.

Figure 5:
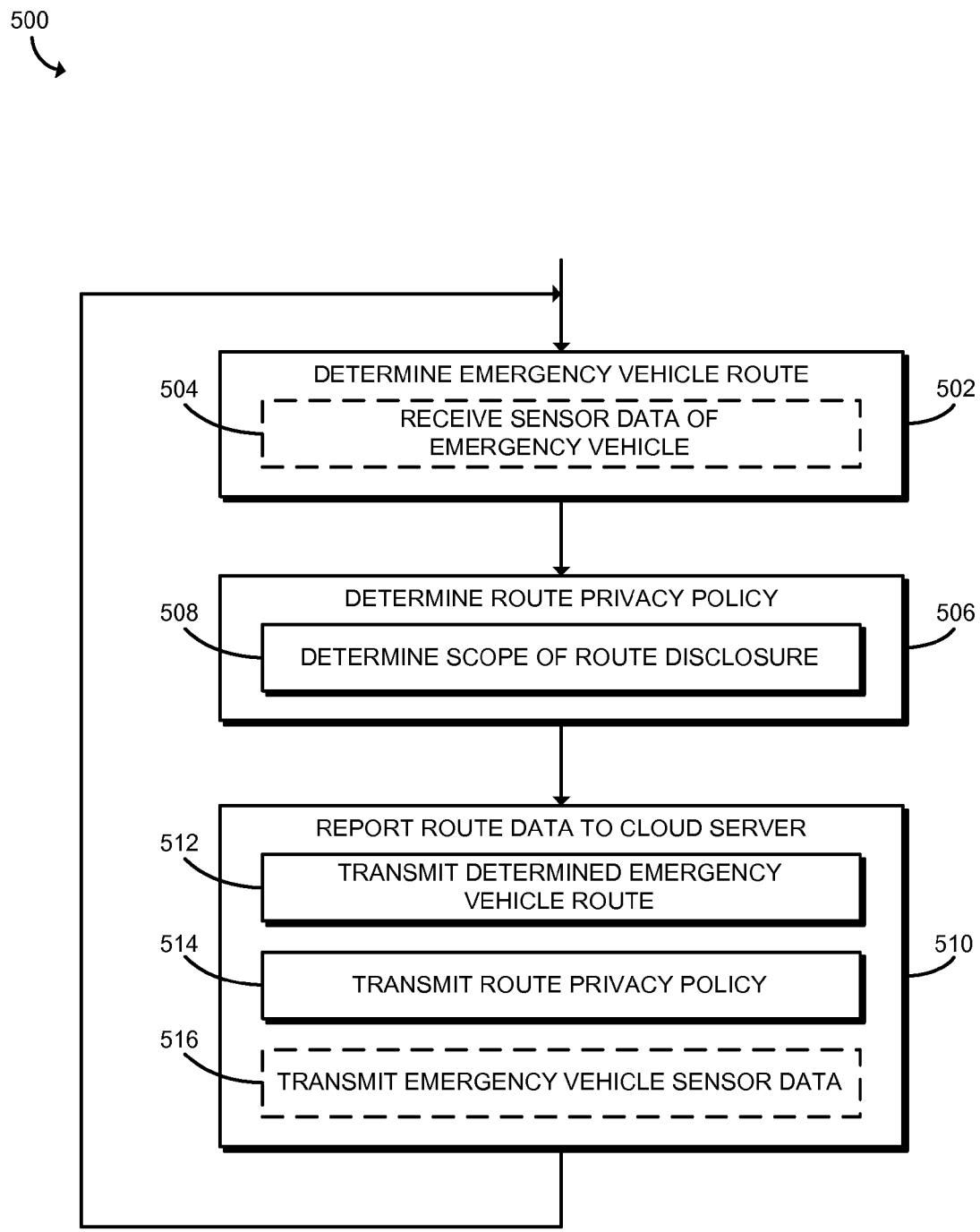
FIG. 5 is a simplified flow diagram of at least one embodiment of a method for reporting emergency vehicle routes from an emergency vehicle to a cloud server of the system of FIG. 1.

Referring now to FIG. 5, in use, the in-vehicle computing system 102 may execute a method 500 for reporting travel routes of the emergency vehicle 110 to the cloud server 106. The illustrative method 500 begins with block 502 of FIG. 5 in which the in-vehicle computing system 102 determines a travel route of the emergency vehicle 110. In doing so, in block 504, the in-vehicle computing system 102 may receive sensor data from the sensors 162 of the in-vehicle computing system 102 in some embodiments. As described above, in some embodiments, the travel route of the emergency vehicle 110 may be a predetermined route. For example, the in-vehicle computing system 102 may utilize a navigation system or mapping service to generate a travel route to an emergency location or other destination. In some embodiments, the in-vehicle computing system 102 may utilize the location of the emergency vehicle 110, the destination, and contextual information to determine the travel route, which may be stored and/or rendered on a display 164 for the driver's viewing. In other embodiments, the in-vehicle computing system 102 may utilize a known destination and analytical/probabilistic techniques to determine the most likely travel route of the emergency vehicle 110.

It should be appreciated that, in some embodiments, various emergency vehicles 110 may have an interest in maintaining the privacy of their travel routes. For example, police cars may completely restrict access to travel routes when responding to an active crime but may not do so when responding to emergencies unrelated to crimes (e.g., traffic accidents). However, in some embodiments, a particular type of emergency vehicles may not restrict access to travel routes at all (e.g., ambulances and/or fire trucks).

In block 506, the in-vehicle computing system 102 determines a route privacy policy 206 corresponding with the current travel route of the emergency vehicle 110. In doing so, the in-vehicle computing system 102 determines the authorized scope of disclosure of the travel route of the emergency vehicle 110 in block 508. In other words, the in-vehicle computing system 102 determines the extent to which the cloud server 106 is authorized to disclose the travel route of the emergency vehicle 110 once the travel route has been transmitted to the cloud server 106. In some embodiments, the in-vehicle computing system 102 may authorize the cloud server 106 to provide other vehicles 112 (e.g., non-emergency vehicles) with the entire travel route of the emergency vehicle 110, whereas in other embodiments, the in-vehicle computing system 102 may only authorize the cloud server 106 to reveal certain portions of the travel route of the emergency vehicle 110 (e.g., depending on the particular vehicle 112). For example, the route privacy policy 206 may indicate that the cloud server 106 is authorized to transmit to a particular vehicle 112 only the portion of the travel route of the emergency vehicle 110 that is between the emergency vehicle 110 and the vehicle 112. In other embodiments, the route privacy policy 206 may be otherwise defined to limit or minimize the disclosure of the travel route to portions necessary to predicting encounters by corresponding vehicles 112. For example, the vehicles 112 may not need to know anything regarding the travel route of the emergency vehicle 110 if they are beyond a particular threshold distance from the emergency vehicle 110 (e.g., travel routes for emergency vehicles in Queens of New York City are irrelevant to vehicles in Staten Island of New York City).

In block 510, the in-vehicle computing system 102 reports route data of the emergency vehicle 110 to the cloud server 106. In doing so, in block 512, the in-vehicle computing system 102 transmits the determined travel route of the emergency vehicle 110 to the cloud server 106. Additionally, in block 514, the in-vehicle computing system 102 transmits the route privacy policy 206 associated with the travel route to the cloud server 106. It should be appreciated that, in some embodiments, the emergency vehicle 110 utilizes the same route privacy policy 206 or collection of route privacy policies 206 for all travel routes of the emergency vehicle 110. In such embodiments, the in-vehicle computing system 102 may transmit the route privacy policies 206 to the cloud server 106 once and indicate which should be used for a particular travel route. In block 516, the in-vehicle computing system 102 may also transmit sensor data of the emergency vehicle 110 to the cloud server 106 (e.g., location, inertial data, and/or other sensor data). For example, the sensor data may be utilized in determining the vehicles 112 to which to transmit the travel route of the emergency vehicle 110. It should be appreciated that, in the illustrative embodiment, the travel route of the emergency vehicle 110 is determined and transmitted in real-time, and the in-vehicle computing system 102 may periodically update the cloud server 106 regarding any changes (e.g., while the emergency vehicle 110 travels along the travel route). For example, the in-vehicle computing system 102 may update the cloud server 106 regarding changes in location, direction, overall route, and/or other travel characteristics.

Figure 6:
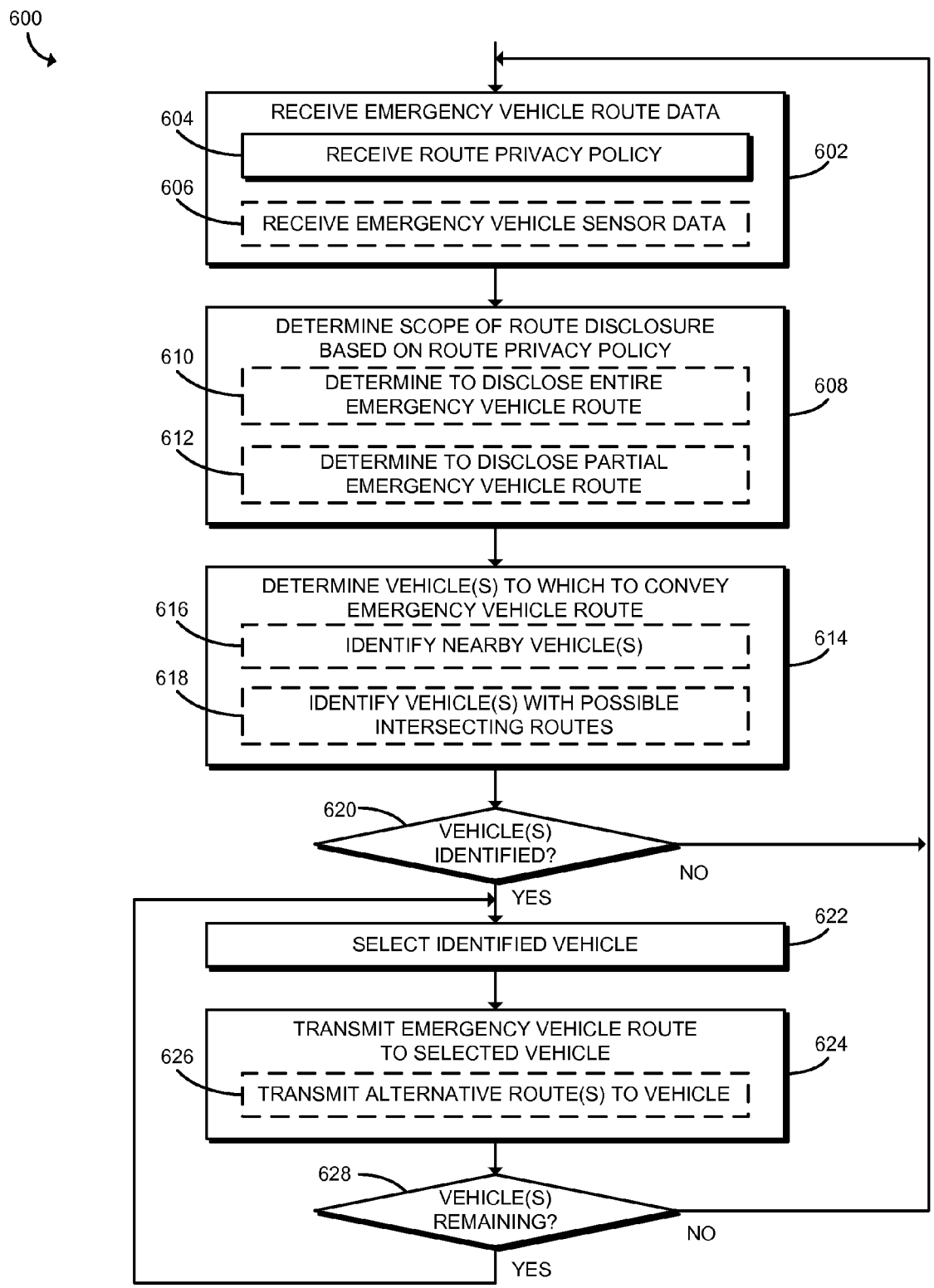
FIG. 6 is a simplified flow diagram of at least one embodiment of a method for reporting emergency vehicle routes by a cloud server of the system of FIG. 1.

Referring now to FIG. 6, in use, the cloud server 106 may execute a method 600 for reporting travel routes of emergency vehicles 110 to other vehicles 112. The illustrative method 600 begins with block 602 of FIG. 6 in which the cloud server 106 receives emergency vehicle route data from an emergency vehicle 110 that identifies an anticipated travel route of the emergency vehicle 110. Further, in block 604, the cloud server 106 receives the route privacy policy 206 of the emergency vehicle 110 associated with the travel route of the emergency vehicle 110. As discussed above, in some embodiments, the route privacy policy 206 may also be stored on the cloud server 106 in which case the cloud server 106 may retrieve the route privacy policy 206 associated with the emergency vehicle 110 travel route. As described above, in block 606, the cloud server 106 may also receive sensor data of the emergency vehicle 110 in some embodiments.

In block 608, the cloud server 106 determines the scope of disclosure of the determined travel route of the emergency vehicle 110 based on the route privacy policy 206 associated with that travel route of the emergency vehicle 110. In other words, the cloud server 106 determines the extent to which it should disclose the travel route of the emergency vehicle 110 to other vehicles 112. For example, as discussed above, the cloud server 106 may determine to disclose the entire travel route of the emergency vehicle 110 to other vehicles 112 in block 610. Alternatively, in block 612, the cloud server 106 may determine to disclose a partial travel route of the emergency vehicle 110 to other vehicles 112 based on the route privacy policy 206. For example, the route privacy policy 206 may indicate that the cloud server 106 is only authorized to transmit the portion of the travel route of the emergency vehicle 110 to a particular vehicle 112 that is between the vehicle 112 and the emergency vehicle 110. As such, it should be appreciated that the route privacy policy 206 may indicate that different portions of the travel route of the emergency vehicle 110 are to be transmitted to corresponding vehicles 112. That is, a first vehicle 112 and a second vehicle 112 may be authorized to receive different portions of the travel route of the emergency vehicle 110 in some embodiments.

In block 614, the cloud server 106 determines the vehicles 112 to which to convey the travel route of the emergency vehicle 110. It should be appreciated that the cloud server 106 may utilize any suitable techniques, algorithms, and/or mechanisms for making such a determination. For example, in block 616, the cloud server 106 may identify vehicles 112 nearby the emergency vehicle 110 or otherwise within a threshold distance or region from the emergency vehicle 110 (e.g., within a few hundred feet, within a mile, within several miles, within a defined geographical region, etc.). In block 612, the cloud server 106 may identify vehicles 112 with travel routes that are likely to intersect the travel route of the emergency vehicle 110. For example, in some embodiments, the cloud server 106 may retrieve travel routes of nearby vehicles 112 (e.g., via a mapping service API, navigation system data, inertial characteristics, and/or other suitable travel data) to determine whether the emergency vehicle 110 is likely to cross paths with particular vehicles 112. Of course, the cloud server 106 may utilize any suitable analytical or probabilistic tools to draw such conclusions depending on the particular embodiment. For example, if the emergency vehicle 110 and vehicle 112 are moving toward one another or toward some cross section or other intersection point, the vehicles 110, 112 may be more likely to encounter one another than if the vehicles 110, 112 are moving in opposite directions. It should be appreciated that in determining which vehicles 112 to which to convey the travel route of the emergency vehicle 110, the cloud server 106 may also determine the corresponding portion of the travel route to convey to each particular vehicle 112 based on the route privacy policy 206 as discussed above.

In block 620, the cloud server 106 determines whether any vehicles 112 have been identified to which to convey the emergency vehicle 110 travel route. If so, in block 622, the cloud server 106 selects an identified vehicle 112. In block 624, the cloud server 106 transmits the portion(s) of the travel route of the emergency vehicle 110 to the selected vehicle 112 that are authorized by the corresponding route privacy policy 206. In some embodiments, the cloud server 106 may transmit one or more alternative routes for the selected vehicle 112 to take in order to avoid encountering the emergency vehicle 110 in block 626. In block 628, the cloud server 106 determines whether there are any identified vehicles 112 remaining to which the cloud server 106 has not yet transmitted the relevant travel route data of the emergency vehicle 110. If so, the method 600 returns to block 622 in which the cloud server 106 selects another identified vehicle 112. If not, the method 600 returns to block 602 in which the cloud server 106 waits to receive further route data from the emergency vehicle 110 or a different emergency vehicle 110. It should be appreciated that the cloud server 106 may periodically or continuously receive travel route data from one or more emergency vehicles 110 and update the relevant vehicles 112 of any changes in the travel route of the emergency vehicles 110. Further, depending on the circumstances, the particular vehicles 112 that are authorized to receive the travel route data and/or the portions of the travel route that those vehicles 112 are authorized to receive may vary over time. For example, a particular vehicle 112 may take an unexpected turn such that it is no longer likely to encounter the emergency vehicle 110 in which case the cloud server 106 may determine not to provide the travel route data to that vehicle 112 based on the route privacy policy 206.

Figure 7:
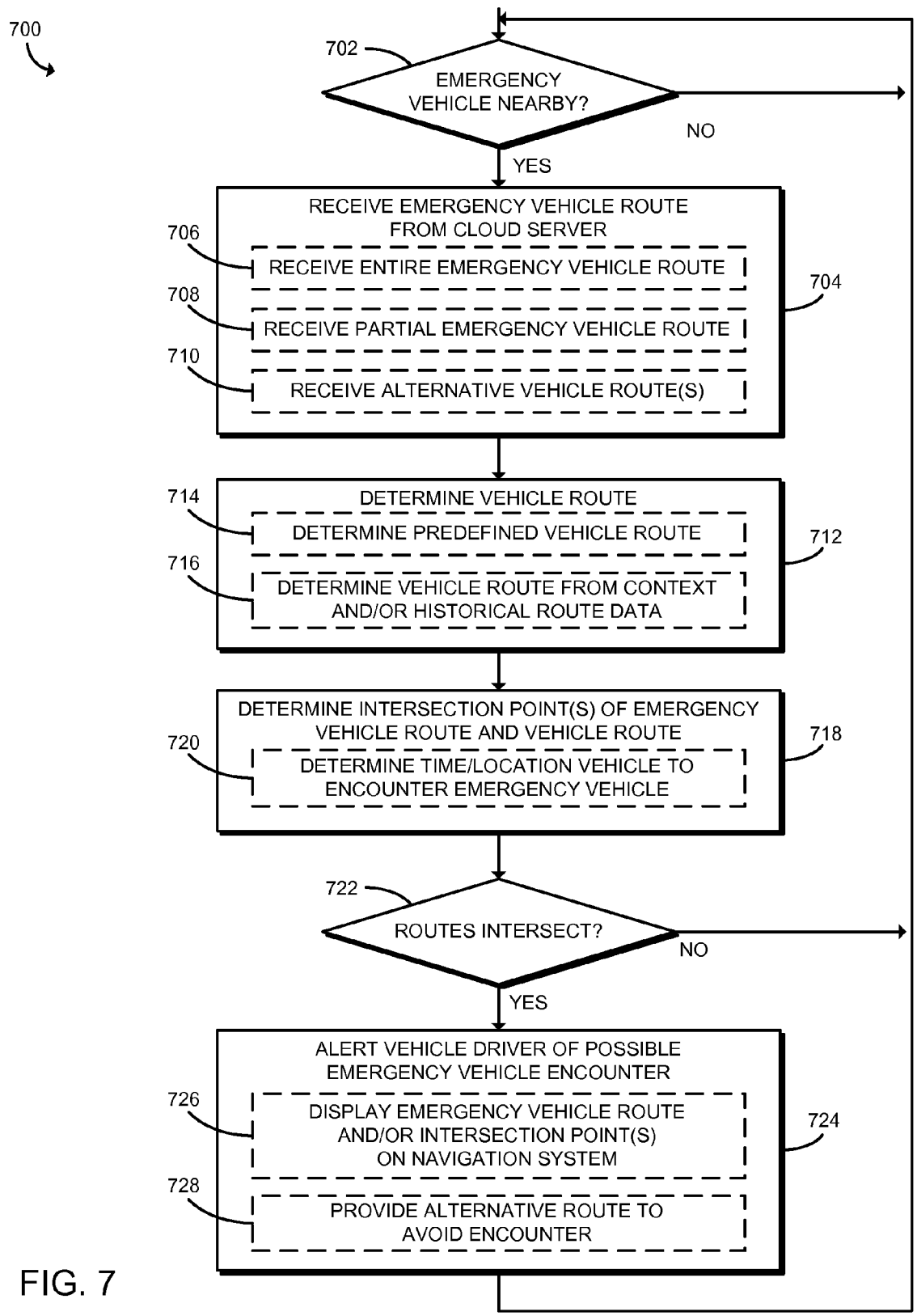
FIG. 7 is a simplified flow diagram of at least one embodiment of a method for predicting emergency vehicle routes by an in-vehicle computing system of a vehicle of the system of FIG. 1.

Referring now to FIG. 7, in use, the in-vehicle computing system 108 of the vehicle 112 may execute a method 700 for predicting travel routes of emergency vehicles 110 for the driver of the vehicle 112. The illustrative method 700 begins with block 702 of FIG. 7 in which the in-vehicle computing system 102 determines whether any emergency vehicles 110 are nearby or within some threshold distance of the vehicle 112. It should be appreciated that, in some embodiments, the cloud server 106 and/or the in-vehicle computing system 108 may determine whether the vehicle 112 and the emergency vehicle 110 are within some threshold distance of one another for route reporting purposes. For example, in some embodiments, the cloud server 106 may determine to report the entire travel route of the emergency vehicle 110 to any interested vehicles 112. In such embodiments, the vehicle 112 may filter out travel routes of emergency vehicles 110 that are outside the threshold distance or otherwise determined to be unnecessary by the in-vehicle computing system 108. In some embodiments, filter parameters, thresholds, and/or other such data may be user-configurable (e.g., by the driver of the vehicle 112).

If the in-vehicle computing system 108 determines there are emergency vehicles 110 nearby the vehicle 112 or within some threshold distance/region of the vehicle 112, or otherwise determines to receive travel route data of one or more emergency vehicles 110 from the cloud server 106, the in-vehicle computing system 108 receives a travel route of an emergency vehicle 110 from the cloud server 106 in block 704. In particular, as discussed above, the in-vehicle computing system 108 may receive the entire travel route of the emergency vehicle 110 in block 706. Alternatively, in block 708, the in-vehicle computing system 108 may receive a partial travel route of the emergency vehicle 110. Further, in block 710, the in-vehicle computing system 108 may receive one or more alternative travel routes for the vehicle 112 in order to avoid an encounter with the emergency vehicle 110 in some embodiments.

In block 712, the in-vehicle computing system 108 determines the anticipated travel route of the vehicle 112. For example, in block 714, the in-vehicle computing system 108 may determine a predefined travel route of the vehicle 112. For example, the in-vehicle computing system 108 may retrieve the travel route of the vehicle 112 from a navigation system in some embodiments. As discussed above, in some embodiments, there may not be a predefined travel route stored on the memory of the in-vehicle computing system 108. In such embodiments, the in-vehicle computing system 108 may determine the travel route of the vehicle 112 based on any suitable algorithms, techniques, and/or mechanisms. In block 716, the in-vehicle computing system 108 may determine the travel route of the vehicle 112 based on the context of the vehicle 112 and/or historical route data 412 stored on the in-vehicle computing system 108. For example, the historical route data 412 may identify past travel routes of the vehicle 112 and/or a particular driver of the vehicle 112. The context of the vehicle 112 may be determined based on data collected by the sensors 162 of the in-vehicle computing system 108, data collected from a mapping service or remote devices regarding the environment of the in-vehicle computing system 108, and/or other information useful in determining the travel route of the vehicle 112. It should be appreciated that, in some embodiments, the in-vehicle computing system 108 may leverage the context data, the historical route data 412, and/or other suitable information to determine the most likely travel route of the vehicle 112. For example, the in-vehicle computing system 108 may determine from the sensor data (e.g., location and time) and the historical route data 412 that the driver is on her way to work. It should further be appreciated that, in some embodiments, the in-vehicle computing system 108 may consider multiple likely travel routes of the vehicle 112 and analyze each of those travel routes to identify likely encounters with an emergency vehicle 110 as described herein.

In block 718, the in-vehicle computing system 108 determines any likely intersection points of the travel route of the emergency vehicle 110 with the travel route of the vehicle 112. In particular, in block 720, the in-vehicle computing system 108 may determine the time and location at which the vehicle 112 is likely to encounter the emergency vehicle 110 in some embodiments. For example, the in-vehicle computing system 108 may compare the travel route of the emergency vehicle 110 known to the in-vehicle computing system 108 (e.g., if only a partial travel route is known) to the determined travel route of the vehicle 112 to determine whether the travel routes have any locations in common. If so, the in-vehicle computing system 108 may further determine the times at which the emergency vehicle 110 and the vehicle 112 are expected to arrive at the common locations (e.g., based on inertial characteristics, traffic patterns, and/or other context data). If the vehicles 110, 112 are expected to arrive at any particular location at approximately the same time, the vehicles 110, 112 will likely encounter one another at that location. It should be appreciated that the intersection points of the travel routes of the vehicles 110, 112 may change over time depending on the particular embodiment.

In block 722, the in-vehicle computing system 108 determines whether any intersection points between the travel route of the vehicle 112 and the travel route of the emergency vehicle 110 have been identified. If so, the in-vehicle computing system 108 alerts the driver of the vehicle 112 of the possible (or likely) encounter with the emergency vehicle 110 in block 724. In doing so, the in-vehicle computing system 108 may display the travel route of the emergency vehicle 110 and/or any determined intersection points of the vehicles 110, 112 on a display 164 of the in-vehicle computing system 108 (e.g., on a navigation system, heads up display (HUD), or other display of the in-vehicle computing system 108) in block 726. Further, in block 728, the in-vehicle computing system 108 may provide one or more alternative routes for the vehicle 112 in order to avoid an encounter with the emergency vehicle 110. For example, the in-vehicle computing system 108 may display alternative travel routes received from the cloud server 106 and/or independently identify alternative travel routes. Although the alert message are described herein primarily with respect to visual alerts, in other embodiments, the alert messages may be provided by virtue of audio messages. Further, in some embodiments, the in-vehicle computing system 102 may provide the alert messages on a mobile computing device of the driver (e.g., a wearable computing device or smartphone).

Of course, in some embodiments, the vehicle 112 may be likely to encounter multiple emergency vehicles 110 such as, for example, emergency vehicles 110 approaching a common emergency location near the vehicle 112 from various different points in a city. In such embodiments, the in-vehicle computing system 108 may notify the driver of possible encounters (e.g., intersection points or travel routes) of multiple emergency vehicles 110. Further, the notifications may be independent or aggregated (e.g., rendered on the same display screen) depending on the particular embodiment. As described above, it should be appreciated that, in some embodiments, the alert mechanisms of the in-vehicle computing system 108 may be integrated with a mapping service or provide an API to a mapping service of the vehicle 112 in order to provide such alerts and/or reporting of the travel routes of emergency vehicles 110. The method 700 returns to block 702 in which the in-vehicle computing system 108 waits to receive further route data from the emergency vehicle 110 (e.g., updated travel route data) or a different emergency vehicle 110.

EXAMPLES

Illustrative examples of the technologies disclosed herein are provided below. An embodiment of the technologies may include any one or more, and any combination of, the examples described below.

Example 1 includes a cloud server for reporting emergency vehicle routes, the cloud server comprising a communication module to receive emergency vehicle route data from an emergency vehicle, wherein the emergency vehicle route data indicates a travel route of the emergency vehicle; a route management module to determine a scope of disclosure of the travel route to other vehicles based on the emergency vehicle route data; and a vehicle identification module to determine one or more other vehicles different from the emergency vehicle to which to convey the travel route of the emergency vehicle, wherein the communication module is further to transmit a portion of the travel route of the emergency vehicle to the one or more other vehicles based on the scope of disclosure.

Example 2 includes the subject matter of Example 1, and wherein the emergency vehicle route data comprises a route privacy policy that indicates the scope of disclosure of the travel route to other vehicles.

Example 3 includes the subject matter of any of Examples 1 and 2, and wherein to determine the scope of disclosure of the travel route comprises to determine to disclose an entire travel route of the emergency vehicle, from an origination point to a destination point, to other vehicles.

Example 4 includes the subject matter of any of Examples 1-3, and wherein to determine the scope of disclosure of the travel route comprises to determine to disclose a partial travel route of the emergency vehicle, from an origination point to a destination point, to other vehicles.

Example 5 includes the subject matter of any of Examples 1-4, and wherein to determine the scope of disclosure of the travel route comprises to determine to disclose a travel route of the emergency vehicle between the emergency vehicle and a corresponding other vehicle for each of the other vehicles.

Example 6 includes the subject matter of any of Examples 1-5, and wherein to receive the emergency vehicle route data comprises to receive sensor data of the emergency vehicle.

Example 7 includes the subject matter of any of Examples 1-6, and wherein to determine the one or more other vehicles to which to convey the travel route of the emergency vehicle comprises to identify one or more vehicles nearby the emergency vehicle.

Example 8 includes the subject matter of any of Examples 1-7, and wherein to determine the one or more other vehicles to which to convey the travel route of the emergency vehicle comprises to identify one or more vehicles having corresponding travel routes that are likely to intersect with the travel route of the emergency vehicle.

Example 9 includes the subject matter of any of Examples 1-8, and wherein to transmit the travel route of the emergency vehicle comprises to transmit a corresponding alternative travel route of the one or more other vehicles.

Example 10 includes a method for reporting emergency vehicle routes, the method comprising receiving, by a cloud server, emergency vehicle route data from an emergency vehicle, wherein the emergency vehicle route data indicates a travel route of the emergency vehicle; determining, by the cloud server, a scope of disclosure of the travel route to other vehicles based on the emergency vehicle route data; determining, by the cloud server, one or more other vehicles different from the emergency vehicle to which to convey the travel route of the emergency vehicle; and transmitting, by the cloud server and based on the scope of disclosure, a portion of the travel route of the emergency vehicle to the one or more other vehicles.

Example 11 includes the subject matter of Example 10, and wherein receiving the emergency vehicle route data comprises receiving a route privacy policy that indicates the scope of disclosure of the travel route to other vehicles.

Example 12 includes the subject matter of any of Examples 10 and 11, and wherein determining the scope of disclosure of the travel route comprises determining to disclose an entire travel route of the emergency vehicle, from an origination point to a destination point, to other vehicles.

Example 13 includes the subject matter of any of Examples 10-12, and wherein determining the scope of disclosure of the travel route comprises determining to disclose a partial travel route of the emergency vehicle, from an origination point to a destination point, to other vehicles.

Example 14 includes the subject matter of any of Examples 10-13, and wherein determining the scope of disclosure of the travel route comprises determining to disclose a travel route of the emergency vehicle between the emergency vehicle and a corresponding other vehicle for each of the other vehicles.

Example 15 includes the subject matter of any of Examples 10-14, and wherein receiving the emergency vehicle route data comprises receiving sensor data of the emergency vehicle.

Example 16 includes the subject matter of any of Examples 10-15, and wherein determining the one or more other vehicles to which to convey the travel route of the emergency vehicle comprises identifying one or more vehicles nearby the emergency vehicle.

Example 17 includes the subject matter of any of Examples 10-16, and wherein determining the one or more other vehicles to which to convey the travel route of the emergency vehicle comprises identifying one or more vehicles having corresponding travel routes that are likely to intersect with the travel route of the emergency vehicle.

Example 18 includes the subject matter of any of Examples 10-17, and wherein transmitting the travel route of the emergency vehicle comprises transmitting a corresponding alternative travel route of the one or more other vehicles.

Example 19 includes a computing device comprising a processor; and a memory having stored therein a plurality of instructions that when executed by the processor cause the computing device to perform the method of any of Examples 10-18.

Example 20 includes one or more machine-readable storage media comprising a plurality of instructions stored thereon that, in response to execution by a computing device, cause the computing device to perform the method of any of Examples 10-18.

Example 21 includes a cloud server for reporting emergency vehicle routes, the cloud server comprising means for receiving emergency vehicle route data from an emergency vehicle, wherein the emergency vehicle route data indicates a travel route of the emergency vehicle; means for determining a scope of disclosure of the travel route to other vehicles based on the emergency vehicle route data; means for determining one or more other vehicles different from the emergency vehicle to which to convey the travel route of the emergency vehicle; and means for transmitting, based on the scope of disclosure, a portion of the travel route of the emergency vehicle to the one or more other vehicles.

Example 22 includes the subject matter of Example 21, and wherein the means for receiving the emergency vehicle route data comprises means for receiving a route privacy policy that indicates the scope of disclosure of the travel route to other vehicles.

Example 23 includes the subject matter of any of Examples 21 and 22, and wherein the means for determining the scope of disclosure of the travel route comprises means for determining to disclose an entire travel route of the emergency vehicle, from an origination point to a destination point, to other vehicles.

Example 24 includes the subject matter of any of Examples 21-23, and wherein the means for determining the scope of disclosure of the travel route comprises means for determining to disclose a partial travel route of the emergency vehicle, from an origination point to a destination point, to other vehicles.

Example 25 includes the subject matter of any of Examples 21-24, and wherein the means for determining the scope of disclosure of the travel route comprises means for determining to disclose a travel route of the emergency vehicle between the emergency vehicle and a corresponding other vehicle for each of the other vehicles.

Example 26 includes the subject matter of any of Examples 21-25, and wherein the means for receiving the emergency vehicle route data comprises means for receiving sensor data of the emergency vehicle.

Example 27 includes the subject matter of any of Examples 21-26, and wherein the means for determining the one or more other vehicles to which to convey the travel route of the emergency vehicle comprises means for identifying one or more vehicles nearby the emergency vehicle.

Example 28 includes the subject matter of any of Examples 21-27, and wherein the means for determining the one or more other vehicles to which to convey the travel route of the emergency vehicle comprises means for identifying one or more vehicles having corresponding travel routes that are likely to intersect with the travel route of the emergency vehicle.

Example 29 includes the subject matter of any of Examples 21-28, and wherein the means for transmitting the travel route of the emergency vehicle comprises means for transmitting a corresponding alternative travel route of the one or more other vehicles.

Example 30 includes an in-vehicle computing system of a vehicle for predicting emergency vehicle routes, the in-vehicle computing system comprising a communication module to receive a first travel route of an emergency vehicle from a cloud server; a route determination module to determine a second travel route of the vehicle; an intersection determination module to determine an intersection point of the first travel route and the second travel route; and a driver notification module to alert a driver of the vehicle regarding a possible encounter with the emergency vehicle in response to the determined intersection point.

Example 31 includes the subject matter of Example 30, and wherein the first travel route comprises an entire travel route of the emergency vehicle from an origination point to a destination point.

Example 32 includes the subject matter of any of Examples 30 and 31, and wherein the first travel route comprises a partial travel route of the emergency vehicle from an origination point to a destination point.

Example 33 includes the subject matter of any of Examples 30-32, and wherein the first travel route comprises a travel route of the emergency vehicle between the vehicle and the emergency vehicle.

Example 34 includes the subject matter of any of Examples 30-33, and wherein the second travel route comprises a predefined travel route of the vehicle.

Example 35 includes the subject matter of any of Examples 30-34, and wherein to determine the second travel route comprises to determine a second travel route of the vehicle based on at least one of a context of the vehicle or historical route data of the vehicle, wherein the historical route data identifies at least one past travel route of the vehicle.

Example 36 includes the subject matter of any of Examples 30-35, and wherein to determine the intersection point of the first travel route and the second travel route comprises to determine a time and location at which the vehicle is to encounter the emergency vehicle based on the first travel route and the second travel route.

Example 37 includes the subject matter of any of Examples 30-36, and wherein to alert the driver of the vehicle comprises to display the first travel route on a display of the in-vehicle computing system.

Example 38 includes the subject matter of any of Examples 30-37, and wherein to alert the driver of the vehicle comprises to display the intersection point on a display of the in-vehicle computing system.

Example 39 includes the subject matter of any of Examples 30-38, and wherein to alert the driver of the vehicle comprises to provide an alternative travel route to the driver that avoids an encounter with the emergency vehicle based on the first travel route and the second travel route.

Example 40 includes the subject matter of any of Examples 30-39, and wherein the vehicle comprises a non-emergency vehicle.

Example 41 includes a method for predicting emergency vehicle routes, the method comprising receiving, by an in-vehicle computing system of a vehicle, a first travel route of an emergency vehicle from a cloud server; determining, by the in-vehicle computing system, a second travel route of the vehicle; determining, by the in-vehicle computing system, an intersection point of the first travel route and the second travel route; and alerting, by the in-vehicle computing system, a driver of the vehicle regarding a possible encounter with the emergency vehicle in response to the determined intersection point.

Example 42 includes the subject matter of Example 41, and wherein receiving the first travel route comprises receiving an entire travel route of the emergency vehicle from an origination point to a destination point.

Example 43 includes the subject matter of any of Examples 41 and 42, and wherein receiving the first travel route comprises receiving a partial travel route of the emergency vehicle from an origination point to a destination point.

Example 44 includes the subject matter of any of Examples 41-43, and wherein receiving the first travel route comprises receiving a travel route of the emergency vehicle between the vehicle and the emergency vehicle.

Example 45 includes the subject matter of any of Examples 41-44, and wherein determining the second travel route comprises determining a predefined travel route of the vehicle.

Example 46 includes the subject matter of any of Examples 41-45, and wherein determining the second travel route comprises determining a second travel route of the vehicle based on at least one of a context of the vehicle or historical route data of the vehicle, wherein the historical route data identifies at least one past travel route of the vehicle.

Example 47 includes the subject matter of any of Examples 41-46, and wherein determining the intersection point of the first travel route and the second travel route comprises determining a time and location at which the vehicle is to encounter the emergency vehicle based on the first travel route and the second travel route.

Example 48 includes the subject matter of any of Examples 41-47, and wherein alerting the driver of the vehicle comprises displaying the first travel route on a display of the in-vehicle computing system.

Example 49 includes the subject matter of any of Examples 41-48, and wherein alerting the driver of the vehicle comprises displaying the intersection point on a display of the in-vehicle computing system.

Example 50 includes the subject matter of any of Examples 41-49, and wherein alerting the driver of the vehicle comprises providing an alternative travel route to the driver that avoids an encounter with the emergency vehicle based on the first travel route and the second travel route.

Example 51 includes the subject matter of any of Examples 41-50, and wherein determining the second travel route comprises determining a travel route of a non-emergency vehicle.

Example 52 includes a computing device comprising a processor; and a memory having stored therein a plurality of instructions that when executed by the processor cause the computing device to perform the method of any of Examples 41-51.

Example 53 includes one or more machine-readable storage media comprising a plurality of instructions stored thereon that, in response to execution by a computing device, cause the computing device to perform the method of any of Examples 41-51.

Example 54 includes an in-vehicle computing system of a vehicle for predicting emergency vehicle routes, the in-vehicle computing system comprising means for receiving a first travel route of an emergency vehicle from a cloud server; means for determining a second travel route of the vehicle; means for determining an intersection point of the first travel route and the second travel route; and means for alerting a driver of the vehicle regarding a possible encounter with the emergency vehicle in response to the determined intersection point.

Example 55 includes the subject matter of Example 54, and wherein the means for receiving the first travel route comprises means for receiving an entire travel route of the emergency vehicle from an origination point to a destination point.

Example 56 includes the subject matter of any of Examples 54 and 55, and wherein the means for receiving the first travel route comprises means for receiving a partial travel route of the emergency vehicle from an origination point to a destination point.

Example 57 includes the subject matter of any of Examples 54-56, and wherein the means for receiving the first travel route comprises means for receiving a travel route of the emergency vehicle between the vehicle and the emergency vehicle.

Example 58 includes the subject matter of any of Examples 54-57, and wherein the means for determining the second travel route comprises means for determining a predefined travel route of the vehicle.

Example 59 includes the subject matter of any of Examples 54-58, and wherein the means for determining the second travel route comprises means for determining a second travel route of the vehicle based on at least one of a context of the vehicle or historical route data of the vehicle, wherein the historical route data identifies at least one past travel route of the vehicle.

Example 60 includes the subject matter of any of Examples 54-59, and wherein the means for determining the intersection point of the first travel route and the second travel route comprises means for determining a time and location at which the vehicle is to encounter the emergency vehicle based on the first travel route and the second travel route.

Example 61 includes the subject matter of any of Examples 54-60, and wherein the means for alerting the driver of the vehicle comprises means for displaying the first travel route on a display of the in-vehicle computing system.

Example 62 includes the subject matter of any of Examples 54-61, and wherein the means for alerting the driver of the vehicle comprises means for displaying the intersection point on a display of the in-vehicle computing system.

Example 63 includes the subject matter of any of Examples 54-62, and wherein the means for alerting the driver of the vehicle comprises means for providing an alternative travel route to the driver that avoids an encounter with the emergency vehicle based on the first travel route and the second travel route.

Example 64 includes the subject matter of any of Examples 54-63, and wherein the means for determining the second travel route comprises means for determining a travel route of a non-emergency vehicle.

Example 65 includes an in-vehicle computing system of an emergency vehicle for reporting a travel route of the emergency vehicle, the in-vehicle computing system comprising a route reporting module to (i) determine the travel route of the emergency vehicle and (ii) determine a route privacy policy for the determined travel route, wherein the route privacy policy identifies a scope of disclosure of the travel route by a cloud server to other vehicles; and a communication module to report emergency vehicle route data to the cloud server, wherein the emergency vehicle route data identifies the travel route of the emergency vehicle and the route privacy policy.

Example 66 includes the subject matter of Example 65, and wherein to determine the travel route of the emergency vehicle comprises to determine a predefined travel route of the emergency vehicle.

Example 67 includes the subject matter of any of Examples 65 and 66, and wherein to determine the travel route of the emergency vehicle comprises to receive sensor data from one or more sensors of the emergency vehicle.

Example 68 includes the subject matter of any of Examples 65-67, and wherein to report the emergency vehicle route data further comprises to transmit the sensor data to the cloud server.

Example 69 includes a method for reporting a travel route of an emergency vehicle, the method comprising determining, by the emergency vehicle, the travel route of the emergency vehicle; determining, by the emergency vehicle, a route privacy policy for the determined travel route, wherein the route privacy policy identifies a scope of disclosure of the travel route by a cloud server to other vehicles; and reporting, by the emergency vehicle, emergency vehicle route data to the cloud server, wherein the emergency vehicle route data identifies the travel route of the emergency vehicle and the route privacy policy.

Example 70 includes the subject matter of Example 69, and wherein determining the travel route of the emergency vehicle comprises determining a predefined travel route of the emergency vehicle.

Example 71 includes the subject matter of any of Examples 69 and 70, and wherein determining the travel route of the emergency vehicle comprises receiving sensor data from one or more sensors of the emergency vehicle.

Example 72 includes the subject matter of any of Examples 69-71, and wherein reporting the emergency vehicle route data further comprises transmitting the sensor data to the cloud server.

Example 73 includes a computing device comprising a processor; and a memory having stored therein a plurality of instructions that when executed by the processor cause the computing device to perform the method of any of Examples 69-72.

Example 74 includes one or more machine-readable storage media comprising a plurality of instructions stored thereon that, in response to execution by a computing device, cause the computing device to perform the method of any of Examples 69-72.

Example 75 includes an in-vehicle computing system of an emergency vehicle for reporting a travel route of the emergency vehicle, the in-vehicle computing system comprising means for determining the travel route of the emergency vehicle; means for determining a route privacy policy for the determined travel route, wherein the route privacy policy identifies a scope of disclosure of the travel route by a cloud server to other vehicles; and means for reporting emergency vehicle route data to the cloud server, wherein the emergency vehicle route data identifies the travel route of the emergency vehicle and the route privacy policy.

Example 76 includes the subject matter of Example 75, and wherein the means for determining the travel route of the emergency vehicle comprises means for determining a predefined travel route of the emergency vehicle.

Example 77 includes the subject matter of any of Examples 75 and 76, and wherein the means for determining the travel route of the emergency vehicle comprises means for receiving sensor data from one or more sensors of the emergency vehicle.

Example 78 includes the subject matter of any of Examples 75-77, and wherein the means for reporting the emergency vehicle route data further comprises means for transmitting the sensor data to the cloud server.

The invention claimed is:

1. A cloud server for reporting emergency vehicle routes, the cloud server comprising:
 a communication module to receive emergency vehicle route data from an emergency vehicle, wherein the emergency vehicle route data indicates a travel route of the emergency vehicle and a route privacy policy that identifies an extent by which the cloud server is permitted to disclose the travel route of the emergency vehicle to other vehicles;
 a route management module to determine a scope of disclosure of the travel route to other vehicles based on the emergency vehicle route data; and
 a vehicle identification module to (i) determine inertial characteristics of one or more other vehicles different from the emergency vehicle and (ii) identify, as a function of the inertial characteristics, a set of the one or more other vehicles to which to convey the travel route of the emergency vehicle,
 wherein the communication module is further to transmit a portion of the travel route of the emergency vehicle to the identified set of the one or more other vehicles based on the scope of disclosure.

2. The cloud server of claim 1, wherein to determine the scope of disclosure of the travel route comprises to determine to disclose an entire travel route of the emergency vehicle, from an origination point to a point at which an emergency is located, to other vehicles.

3. The cloud server of claim 1, wherein to determine the scope of disclosure of the travel route comprises to determine to disclose a partial travel route of the emergency vehicle, from an origination point to a point at which an emergency is located, to other vehicles.

4. The cloud server of claim 3, wherein to determine the scope of disclosure of the travel route comprises to determine to disclose a travel route of the emergency vehicle between the emergency vehicle and a corresponding other vehicle for each of the other vehicles of the identified set.

5. The cloud server of claim 1, wherein to receive the emergency vehicle route data comprises to receive sensor data of the emergency vehicle.

6. The cloud server of claim 1, wherein to identify the set of one or more other vehicles to which to convey the travel route of the emergency vehicle comprises to identify one or more vehicles nearby the emergency vehicle.

7. The cloud server of claim 1, wherein to identify the set of one or more other vehicles to which to convey the travel route of the emergency vehicle comprises to identify, based on global positioning system (GPS) sensor data, one or more vehicles having corresponding travel routes that are likely to intersect with the travel route of the emergency vehicle.

8. The cloud server of claim 1, wherein to transmit the travel route of the emergency vehicle comprises to transmit a corresponding alternative travel route of the one or more other vehicles.

9. One or more machine-readable storage media comprising a plurality of instructions stored thereon that, in response to execution by a cloud server, cause the cloud server to:
 receive emergency vehicle route data from an emergency vehicle, wherein the emergency vehicle route data indicates a travel route of the emergency vehicle and a route privacy policy that identifies an extent by which the cloud server is permitted to disclose the travel route of the emergency vehicle to other vehicles;
 determine a scope of disclosure of the travel route to other vehicles based on the emergency vehicle route data;
 determine inertial characteristics of one or more other vehicles different from the emergency vehicle;
 identify, as a function of the inertial characteristics, a set of the one or more other vehicles to which to convey the travel route of the emergency vehicle; and
 transmit, based on the scope of disclosure, a portion of the travel route of the emergency vehicle to the identified set of the one or more other vehicles.

10. The one or more machine-readable storage media of claim 9, wherein to determine the scope of disclosure of the travel route comprises to determine to disclose an entire travel route of the emergency vehicle, from an origination point to a point at which an emergency is located, to other vehicles.

11. The one or more machine-readable storage media of claim 9, wherein to determine the scope of disclosure of the travel route comprises to determine to disclose a partial travel route of the emergency vehicle, from an origination point to a point at which an emergency is located, to other vehicles.

12. The one or more machine-readable storage media of claim 11, wherein to determine the scope of disclosure of the travel route comprises to determine to disclose a travel route of the emergency vehicle between the emergency vehicle and a corresponding other vehicle for each of the other vehicles in the identified set.

13. The one or more machine-readable storage media of claim 9, wherein to identify the set of the one or more other vehicles to which to convey the travel route of the emergency vehicle comprises to identify one or more vehicles nearby the emergency vehicle.

14. The one or more machine-readable storage media of claim 9, wherein to identify the set of one or more other vehicles to which to convey the travel route of the emergency vehicle comprises to identify, based on global positioning system (GPS) sensor data, one or more vehicles having corresponding travel routes that are likely to intersect with the travel route of the emergency vehicle.

15. An in-vehicle computing system of a vehicle for predicting emergency vehicle routes, the in-vehicle computing system comprising:
 a communication module to receive a first travel route of an emergency vehicle from a cloud server;
 a route determination module to determine a second travel route of the vehicle based on (i) a context of the vehicle and (ii) a past travel route of the vehicle;
 an intersection determination module to determine an intersection point of the first travel route and the second travel route; and
 a driver notification module to alert a driver of the vehicle regarding a possible encounter with the emergency vehicle in response to the determined intersection point.

16. The in-vehicle computing system of claim 15, wherein the first travel route comprises an entire travel route of the emergency vehicle from an origination point to a destination point.

17. The in-vehicle computing system of claim 15, wherein the first travel route comprises a partial travel route of the emergency vehicle from an origination point to a destination point.

18. The in-vehicle computing system of claim 17, wherein the first travel route comprises a travel route of the emergency vehicle between the vehicle and the emergency vehicle.

19. The in-vehicle computing system of claim 15, wherein the second travel route comprises a predefined travel route of the vehicle.

20. The in-vehicle computing system of claim 15, wherein to determine the intersection point of the first travel route and the second travel route comprises to determine a time and location at which the vehicle is to encounter the emergency vehicle based on the first travel route and the second travel route.

21. The in-vehicle computing system of claim 15, wherein to alert the driver of the vehicle comprises to display at least one of (i) the first travel route or (ii) the intersection point on a display of the in-vehicle computing system.

22. The in-vehicle computing system of claim 15, wherein to alert the driver of the vehicle comprises to provide an alternative travel route to the driver that avoids an encounter with the emergency vehicle based on the first travel route and the second travel route.

23. The in-vehicle computing system of claim 15, wherein the vehicle comprises a non-emergency vehicle.

* * * * *